United States Patent
Sharifi et al.

(10) Patent No.: US 9,268,845 B1
(45) Date of Patent: Feb. 23, 2016

(54) AUDIO MATCHING USING TIME ALIGNMENT, FREQUENCY ALIGNMENT, AND INTEREST POINT OVERLAP TO FILTER FALSE POSITIVES

(75) Inventors: Matthew Sharifi, Zurich (CH); Gheorghe Postelnicu, Zurich (CH); Annie Chen, Thalwil (CH); Dominik Roblek, Ruschlikon (CH)

(73) Assignee: GOOGLE INC., Mountain View, CA (US)

(*) Notice: Subject to any disclaimer, the term of this patent is extended or adjusted under 35 U.S.C. 154(b) by 980 days.

(21) Appl. No.: 13/415,786

(22) Filed: Mar. 8, 2012

(51) Int. Cl.
G06F 17/30 (2006.01)

(52) U.S. Cl.
CPC .............................. *G06F 17/3074* (2013.01)

(58) Field of Classification Search
CPC ... H04H 60/37; H04H 2201/90; H04H 60/58; H04H 60/56; G06K 9/0055; G06K 15/02; G06K 15/10; G06K 15/20; G10L 15/02; G10L 15/10; G10L 15/20
See application file for complete search history.

(56) References Cited

U.S. PATENT DOCUMENTS

| | | | |
|---|---|---|---|
| 6,292,775 B1* | 9/2001 | Holmes | 704/209 |
| 6,453,252 B1 | 9/2002 | Laroche | |
| 6,721,488 B1 | 4/2004 | Dimitrova et al. | |
| 7,516,074 B2 | 4/2009 | Bilobrov | |
| 7,809,580 B2 | 10/2010 | Hotho et al. | |
| 2002/0023020 A1 | 2/2002 | Kenyon et al. | |
| 2005/0177372 A1* | 8/2005 | Wang et al. | 704/273 |
| 2009/0012638 A1 | 1/2009 | Lou | |
| 2011/0276157 A1* | 11/2011 | Wang et al. | 700/94 |

OTHER PUBLICATIONS

Media Hedge, "Digital Fingerprinting," White Paper, Civolution and Gracenote, 2010, http://www.civolution.com/fileadmin/bestanden/white%20papers/Fingerprinting%20-%20by/%20Civolution%20and%20Gracenote%20-%202010. pdf, Last accessed Jul. 11, 2012.

Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed Jul. 11, 2012.

MusicBrainz—The Open Music Encyclopedia, http://musicbrainz.org, Last accessed Apr. 12, 2012.

Shazam, http://www.shazam.com, Last accessed Apr. 19, 2012.

* cited by examiner

*Primary Examiner* — Curtis Kuntz
*Assistant Examiner* — Thomas Maung
(74) *Attorney, Agent, or Firm* — Fenwick & West LLP (57) ABSTRACT

Systems and methods audio matching using interest point overlap are disclosed herein. The systems include determining at least one matching reference segment based on a probe segment. Interest points for both the at least one matching reference segment and the probe segment can be generated. Probe segment interest points and matching reference segment interest points can be time aligned and frequency aligned. A count can be generated based on a number of overlapping interest points between each set of reference interest points and the set of probe segment interest points. The disclosed systems and methods allow false positive reference to be identified and eliminated based on the count. The benefits in eliminating false positive matches improve the accuracy of an audio matching system.

17 Claims, 7 Drawing Sheets

AUDIO MATCHING USING TIME ALIGNMENT, FREQUENCY ALIGNMENT, AND INTEREST POINT OVERLAP TO FILTER FALSE POSITIVES

TECHNICAL FIELD

This application relates to audio matching, and more particularly to using time alignment, frequency alignment, and interest point overlap to eliminate false positive matching reference samples.

BACKGROUND

Audio samples can be recorded by many commercially available electronic devices such as smart phones, tablets, e-readers, computers, personal digital assistants, personal media players, etc. Audio matching provides for identification of a recorded audio sample by comparing the audio sample to a set of reference samples. To make the comparison, an audio sample can be transformed to a time-frequency representation of the sample by using, for example, a short time Fourier transform (STFT). Using the time-frequency representation, interest points that characterize time and frequency locations of peaks or other distinct patterns of the spectrogram can then be extracted from the audio sample. Fingerprints or descriptors can be computed as functions of sets of interest points. Fingerprints of the audio sample can then be compared to fingerprints of reference samples to determine identity of the audio sample.

When comparing the fingerprint of an audio sample to fingerprints of reference samples, it is desirable to have a database containing enough reference samples to make the comparison. The audio sample could come from any of a large number of sources, and be of any of a variety of content types (e.g., from music, from a movie, or from a television show). Consequently, a database of reference samples that contains sufficient music samples, movie samples, and television samples to afford for accurate matching could contain millions of samples.

When implementing an audio matching system using millions of samples as reference samples, it is likely, that in matching a sample fingerprint to the millions of reference fingerprints, that too many references may be returned as potential matches. These false positive matches present challenges in determining the actual identity of the recorded audio sample. Thus, effectively filtering and eliminating false positive matches in attempting to identity the recorded audio sample is desirable.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Systems and methods disclosed herein relate to audio matching. A reference matching component can generate at least one matching reference segment based on a probe segment. An interest point detection component can generate a set of reference segment interest points for each matching reference segment and a set of probe segment interest points. A time alignment component can time align the probe segment and the at least one matching reference segments based on a probe segment start time and a reference segment start time. A frequency alignment component can frequency align the probe segment and the at least one matching reference segments. A counting component can generate a count based on a number of overlapping interest points between each set of reference interest points and the set of probe segment interest points. A filtering component can eliminate the matching reference segment based on the count.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Audio matching in general involves analyzing an audio sample for unique characteristics that can be used in comparison to unique characteristics of reference samples to identify the audio sample. One manner to identify unique characteristics of an audio sample is through use of a spectrogram. A spectrogram represents an audio sample by plotting time on one axis and frequency on another axis. Additionally, amplitude or intensity of a certain frequency at a certain time can also be incorporated into the spectrogram by using color or a third dimension.

There are several different techniques for creating a spectrogram. One technique involves using a series of band-pass filters that can filter an audio sample at a specific frequency and measure amplitude of the audio sample at that specific frequency over time. The audio sample can be run through additional filters to individually isolate a set of frequencies to measure the amplitude of the set over time. A spectrogram can be created by combining all the measurements over time on the frequency axis to generate a spectrogram image of frequency amplitudes over time.

A second technique involves using short-time Fourier transform ("STFT") to break down an audio sample into time windows, where each window is Fourier transformed to calculate a magnitude of the frequency spectrum for the duration of each window. Combining a plurality of windows side by side on the time axis of the spectrogram creates an image of frequency amplitudes over time. Other techniques, such as wavelet transforms, can also be used to construct a spectrogram.

Creating and storing in a database an entire spectrogram for a plurality of reference samples can require large amounts of storage space and affect scalability of an audio matching system. Therefore, it is desirable to instead calculate and store compact descriptors ("fingerprints") of reference samples versus an entire spectrogram. One method of calculating fingerprints is to first determine individual interest points that identify unique characteristics of local features of the time-frequency representation of the reference sample. Fingerprints can then be computed as functions of sets of interest points.

Calculating interest points involves identifying unique characteristics of the spectrogram. For example, an interest point could be a spectral peak of a specific frequency over a specific window of time. As another non-limiting example, an interest point could also include timing of the onset of a note. It is to be appreciated that conceivably any suitable spectral event over a specific duration of time could constitute an interest point.

When comparing the fingerprint of an audio sample to fingerprints of reference samples, it is desirable to have a database containing enough reference samples to make the comparison. The audio sample could come from any of a large number of sources, and be of any of a variety of content types (e.g., from music, from a movie, or from a television show). Consequently, a database of reference samples that contains sufficient music samples, movie samples, and television samples to afford for accurate matching could contain millions of samples.

When implementing an audio matching system using a vast set (e.g., millions) of samples as reference samples, it is likely, that in matching a sample fingerprint to the vast set of reference fingerprints, that too many references may be returned as potential matches. For example, an audio matching system can use the fingerprint of a probe segment containing interest points to match the probe segment to the vast set of reference segments stored in a database. In attempting to match the probe segment, more than one reference segments may be identified as potential matches based on a comparison of fingerprints and respective interest points. Thus, the precision of the matching system is less accurate than desired, as multiple non-matching references ("false positives") are identified along with the actual matching reference.

Systems and methods herein provide for generating interest points that correspond to the probe segment and the potential matching reference segments. The probe segment and potential matching reference segments can be frequency aligned and time aligned. A count can then be generated that counts the number of overlapping interest points between the probe segment and each potential matching reference segment. False positive matches can then be filtered or eliminated as potential matches based on the count. Thus, the systems and methods can increase accuracy of an audio matching system by eliminating false positives as potential matches.

Figure 1:
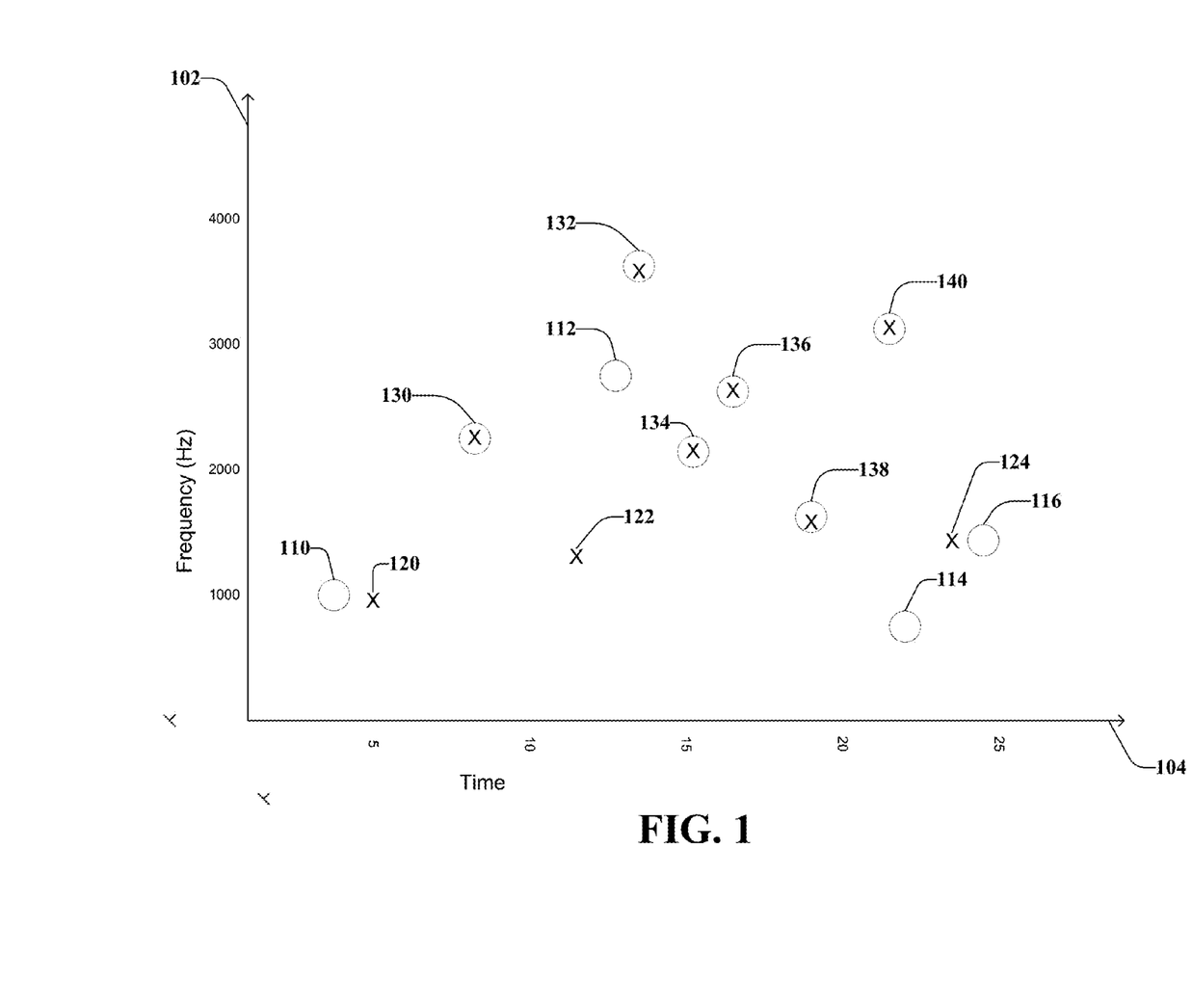
FIG. 1 illustrates an example time frequency plot of interest point overlap between a reference segment and a probe segment.

Referring initially to FIG. 1, there is illustrated an example time frequency plot of interest point overlap between a reference segment and a probe segment. Vertical axis 102 plots frequency, in this example in hertz (Hz). Horizontal axis 104 plots time. Interest points 120, 122, and 124 correspond to spectral events at a specific time and frequency. For example, interest point 120 occurs at a time of 5 and a frequency of 1000 Hz. Interest points 120, 122, and 124, denoted by an "X" on FIG. 1 correspond to unmatched probe interest points. Interest points 110, 112, 114, and 116, denoted by an "O" correspond to unmatched reference interest points. Points 130, 132, 134, 136, 138 and 140, denoted by an "X" within an "O" correspond to matched probe and reference interest points. It can be appreciated that FIG. 1 is an example diagram only and that probe segments and reference segments can contain many more interest points and can occur at time and frequencies not represented in FIG. 1.

There are different ways to analyze the data contained in FIG. 1. For example, in counting the number of probe segment interest points that overlap with reference segment interest points, it is clear that six probe segment interest points are matched with reference segment interest points, while three interest points are unmatched. Using a simple percentage calculation, six out of nine or 66% of probe segment interest points match reference segment interest points. Alternatively, four reference segment interest points are unmatched while six reference segment interest point match probe segment interest points. Using a simple percentage calculation, six out of ten or 60% of reference segment interest points match probe segment interest points. It can be appreciated that both methods of counting can be used separately or concurrently in various implementations disclosed herein.

It can also be appreciated that the tolerance in determining whether a probe segment interest point and reference segment interest point overlap can be adjusted. For example, a threshold distance between two interest points on a time-frequency plot can be established wherein interest points within the threshold distance are considered to be overlapping.

Figure 2:
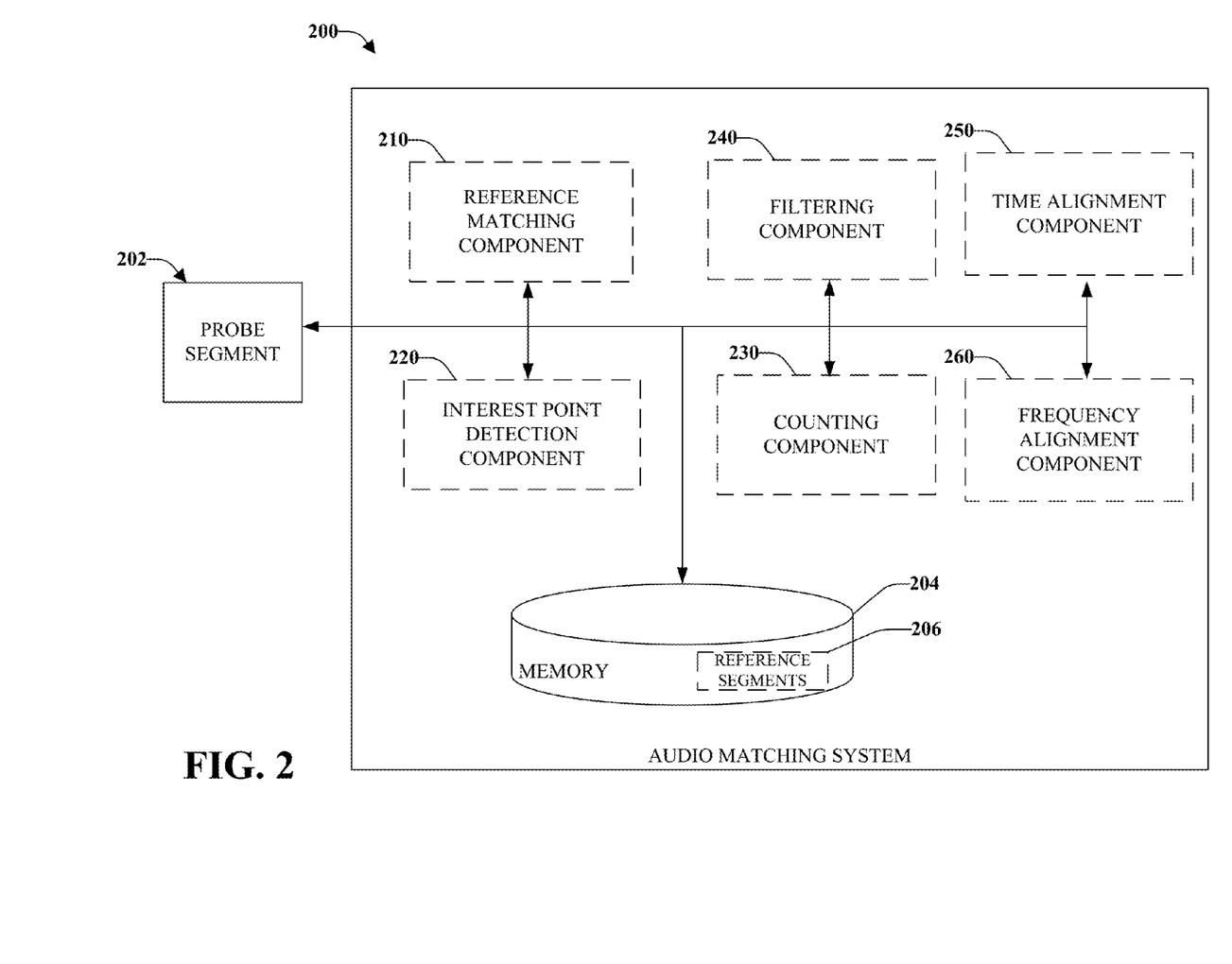
FIG. 2 illustrates a high-level functional block diagram of an example audio matching system using interest point overlap to eliminate false positive matches.

Referring now to FIG. 2, there illustrated is a high-level functional block diagram of an example audio matching system 200 using interest point overlap to eliminate false positive matches. Reference matching component 210 can generate at least one matching reference segment based upon a probe segment 202. Reference matching component 210 can use a plurality of reference segments 206 stored in memory 204 to generate the at least one matching reference segment.

Interest point detection component 220 can generate a set of reference segment interest points for each matching reference segment generated by reference matching component 210. Interest point detection component 220 can also generate a set of probe segment interest points based on probe segment 202. It can be appreciated that interest point detection component 220 can generate interest points based on any interest point detection method.

Counting component 230 can generate a count based on a number of overlapping interest points between each set of reference interest points and the set of probe segment interest points. For example, if reference matching component 210 generates ten matching reference segments and interest point detection component 220 generates ten sets of reference segment interest points (e.g., one set for each generated reference segment), counting component 230 can generate ten counts where each count is associated with a reference segment.

In one implementation, counting component 230 can generate the count by at least one of counting a number of interest points in the set of probe segment interest points that overlap with interest points in each set of reference segment interest points or counting a number of interest points in each set of reference segment interest points that overlap with interest points in the set of probe segment interest points. In another implementation, counting component 230 can generate the count based on a frequency tolerance. For example, as discussed in above in regards to FIG. 1, two interest points overlap if the distance between them in frequency and time is less than the tolerance.

In one implementation, counting component 230 can generate a count based on additional features beyond time or frequency. For example, the additional feature can be represented by the function F. The domain of F is all interest points. F can map an interest point to a feature value. For an arbitrary probe interest point A and an arbitrary matching reference interest point B, and an arbitrary non-matching reference interest point C, the probability that F(A) equals F(B) is greater than the probability that F(A) equals F(C). Counting component 230 can count only those interest points that also match in one or more additional features.

Filtering component 240 can eliminate a matching reference segment based on the count. For example, matching reference segments with a low number of matching interest points can be determined to be false positives and eliminated as potential matches. In one implementation, filtering component 240 can eliminate matching reference segments further based on comparing the count to a predetermined threshold wherein the predetermined threshold is based on at least one of a user or a trained classifier. For example, a user could set a threshold which must be met in order for the matching reference segment to avoid being assessed as a false positive. Alternatively, a classifier can be trained that assesses the count regarding setting an accurate threshold in connection with assessing, inferring, or determining whether the matching reference segment is a false positive.

Time alignment component 250 can time align the probe segment and the matching reference segment based on a probe segment start time and a reference segment time. For example, if the probe segment has been time shifted, time-stretched or time compressed, accurate determination of overlapping interest points may be difficult. Using a start time of both the probe segment and the reference segment, a simple time shift may be made to time align interest points of the probe segment with those of the matching reference segments generated by reference matching component 210.

In one implementation, time alignment component 310 can further time align a probe segment and a matching reference segment based on a probe segment start time, probe segment end time, reference segment start time, and reference segment end time. Using start times and end times of both the probe segment and the reference segment, a probe segment suffering from either time stretching or time compression can be time aligned with an undistorted reference segment.

Frequency alignment component 260 can frequency align the probe segment and the at least one matching reference segment. For example, if the probe segment and the matching reference segment have at least one overlapping interest point, the remaining interest points can be frequency aligned based on the overlapping pair. Linear frequency-stretching or frequency compression can be determined based on comparing the non-overlapping interest points with the overlapping pair. In another example, a probe segment suffering from a linear frequency shift or a pitch shift can be aligned by examining a frequency ratio between an anchor point and the remaining generated interest points. A probe segment that has been pitch shifted may retain the same frequency ratio between an anchor point and interest points as the corresponding frequency ratios of a reference segment. Frequency alignment component 410 can apply a simple identity function to a probe segment that does not need frequency alignment, e.g., was not pitch stretched, pitch compressed, or pitch shifted.

In one implementation, frequency alignment component 260 can generate a frequency ratio for each interest point in the set of reference segment interest points that overlaps with interest points in the set of probe segment interest points. Frequency alignment component 260 can frequency align the probe segment and the at least one matching reference segment based on the frequency ratio. For example, in one implementation, counting component 230 can count only the overlapping points with the most frequent frequency ratio. In one implementation, the correct frequency ratio can be discovered before generating the count. For example, if it is known that the frequency ratio is limited to some small range, then the frequency ratio can be implicitly discovered by generating a count in very small steps over the small range of frequency ratios until the count reaches a threshold indicative of an established frequency ratio.

To provide for or aid in the numerous inferences described herein, components described herein can examine the entirety or a subset of data available and can provide for reasoning about or infer states of a system, environment, and/or client from a set of observations as captured via events and/or data. Inference can be employed to identify a specific context or action, or can generate a probability distribution over states, for example. The inference can be probabilistic—that is, the computation of a probability distribution over states of interest based upon a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed.

Classification as used herein also is inclusive of statistical regression that is utilized to develop models of priority.

Figure 3:
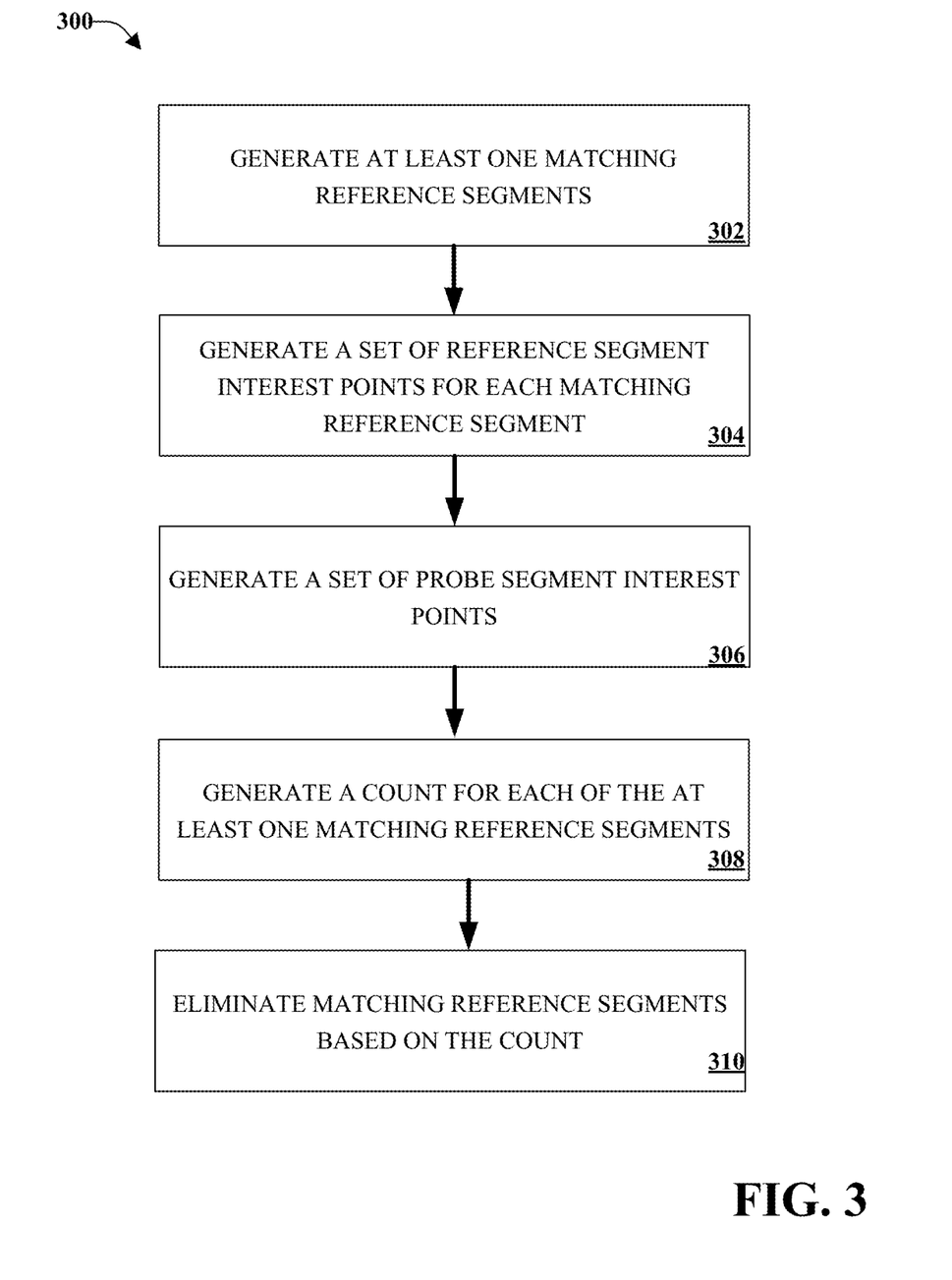
FIG. 3 illustrates an example methodology for using interest point overlap to eliminate false positive matches in matching an audio sample.
Figure 4:
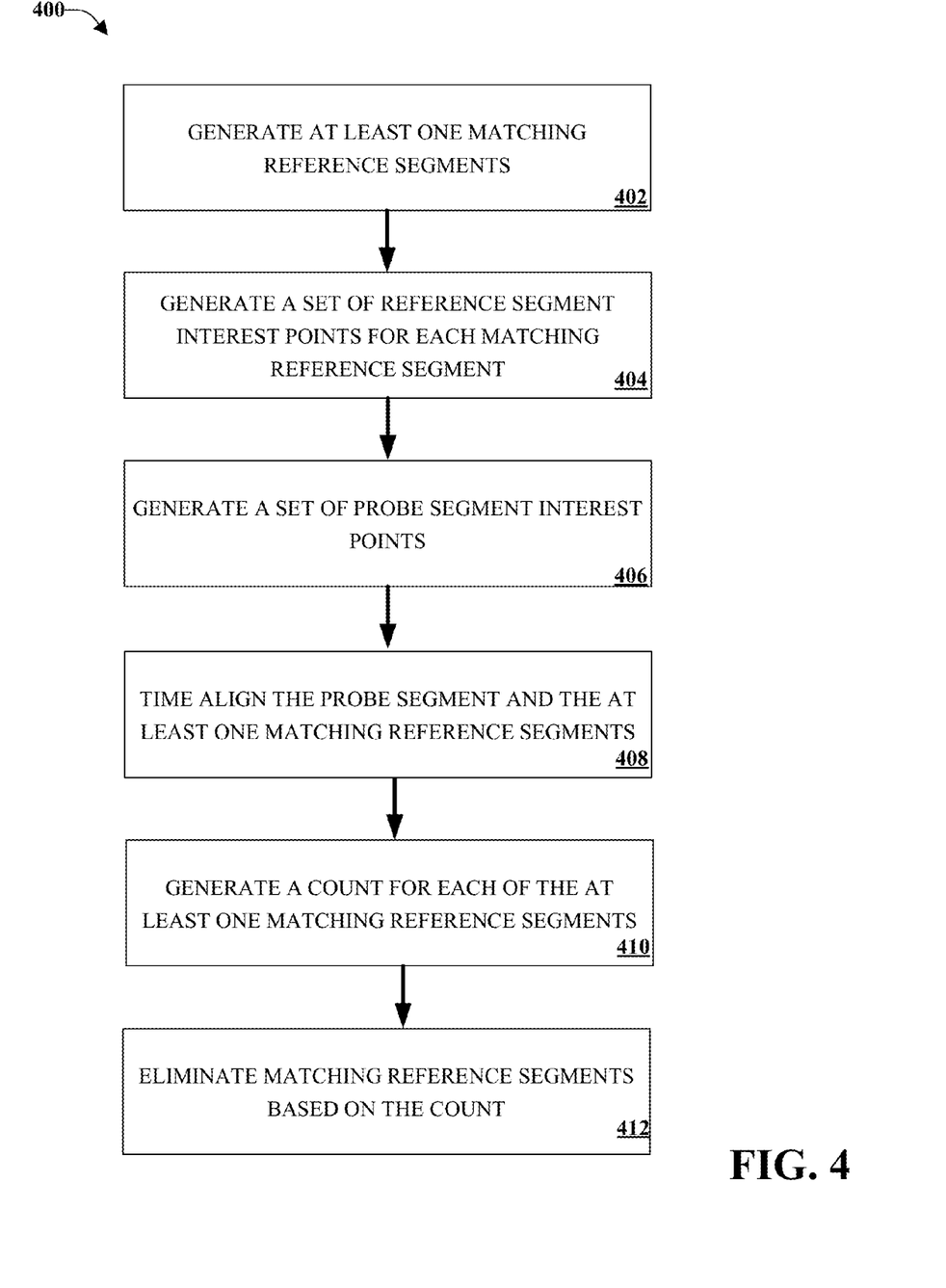
FIG. 4 illustrates an example methodology for using interest point overlap and time alignment to eliminate false positive matches in matching an audio sample.
Figure 5:
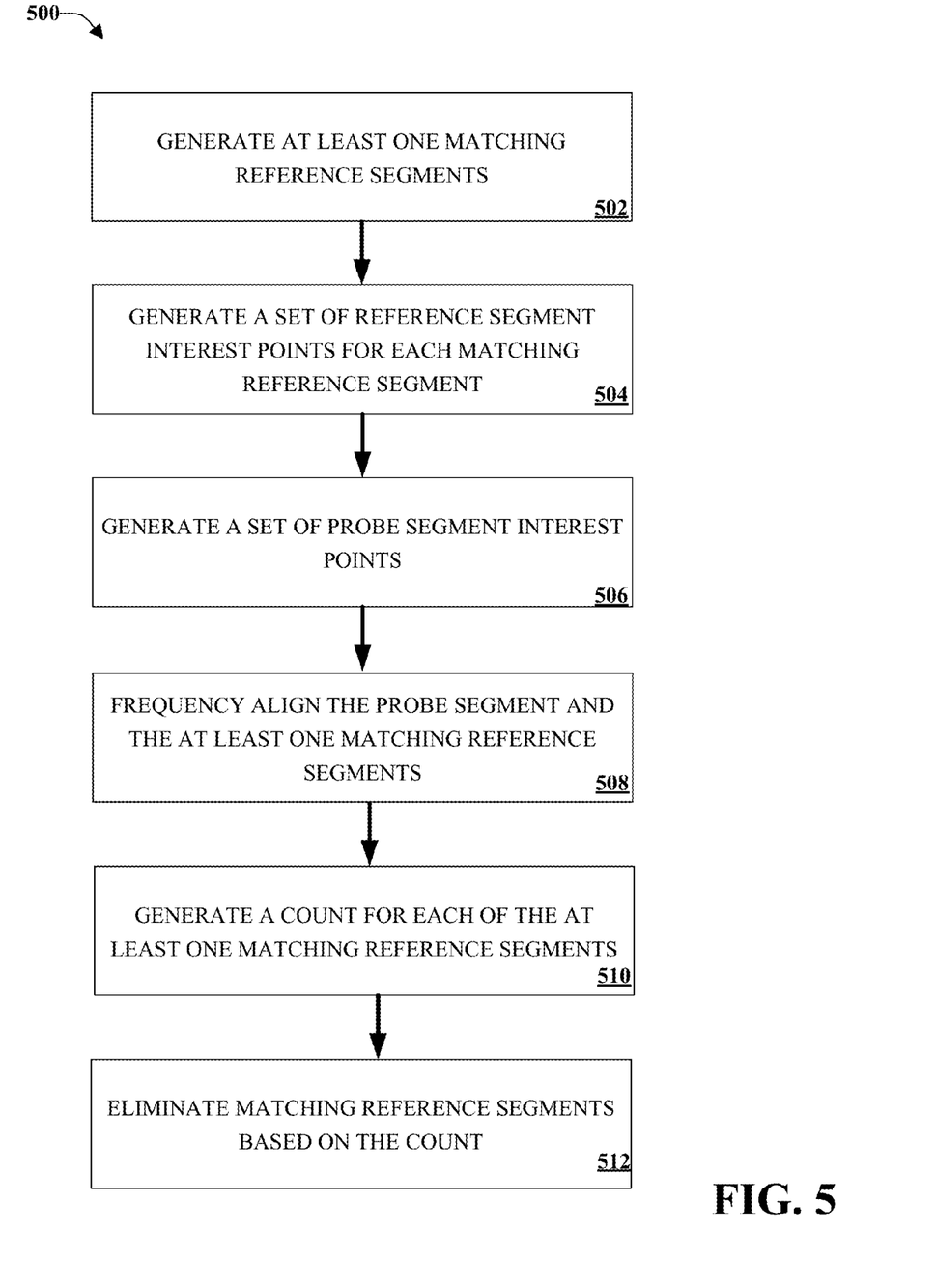
FIG. 5 illustrates an example methodology for using interest point overlap and frequency alignment to eliminate false positive matches in matching an audio sample.

FIGS. 3-5 illustrate methodologies and/or flow diagrams in accordance with this disclosure. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be appreciated that the methodologies disclosed in this specification are capable of being stored on an article of manufacture to facilitate transporting and transferring such methodologies to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with the following methodologies.

FIG. 3 illustrates an example methodology for using interest point overlap in matching an audio sample. At 302, at least one matching reference segment is generated (e.g., by a reference matching component) based on a probe segment. At 304, a set of reference segment interest points can be generated (e.g., by an interest point detection component) for each matching reference segment. At 306, a set of probe segment interest points can be generated (e.g., by an interest point detection component) based on the probe segment.

At 308, a count can be generated (e.g., by a counting component) for the at least one matching reference segments. In one implementation a separate count can be generated for each matching reference segment. In one implementation, the count can be generated further based on at least one of counting a number of interest points in the set of probe segment interest points that overlap with interest points in each set of reference segment interest points or counting a number of interest points in each set of reference segment interest points that overlap with interest points in the set of probe segment interest points. In one implementation, the count is generated further based on a frequency tolerance.

At 310, matching reference segments are eliminated (e.g., by a filtering component) as potential matches based on the count. In one implementation, matching reference segments can be eliminated further based on comparing the count to a predetermined threshold wherein the predetermined threshold is based on at least one of a user or a trained classifier.

FIG. 4 illustrates an example methodology for using interest point overlap and time alignment in matching an audio sample. At 402, at least one matching reference segment is generated (e.g., by a reference matching component) based on a probe segment. At 404, a set of reference segment interest points can be generated (e.g., by an interest point detection component) for each matching reference segment. At 406, a set of probe segment interest points can be generated (e.g., by an interest point detection component) based on the probe segment.

At 408, the probe segment and the at least one matching reference segment are time aligned (e.g., by a time alignment component) based on a probe segment start time and a matching reference segment start time. In one implementation, the time alignment is further based on a probe segment end time and matching reference segment end time. In one implementation, the time aligning includes aligning for at least one of time stretching, time compression, or time shifting.

At 410, a count can be generated (e.g., by a counting component) for the at least one matching reference segments. At 412, matching reference segments are eliminated (e.g., by a filtering component) as potential matches based on the count.

FIG. 5 illustrates an example methodology for using interest point overlap and frequency alignment in matching an audio sample. At 502, at least one matching reference segment is generated (e.g., by a reference matching component) based on a probe segment. At 504, a set of reference segment interest points can be generated (e.g., by an interest point detection component) for each matching reference segment. At 506, a set of probe segment interest points can be generated (e.g., by an interest point detection component) based on the probe segment.

At 508, the probe segment and the at least one matching reference segment are frequency aligned (e.g., by a frequency alignment component). In one implementation, the frequency aligning includes aligning for at least one of frequency stretching, frequency compression, or frequency shifting.

In one implementation, a frequency ratio can be generated (e.g., by a frequency alignment component) for each interest point in each set of reference segment interest points that overlaps with an interest point in the set of probe segment interest points. Frequency aligning the probe segment and the at least one matching reference segment can be further based on the frequency ratio.

At 510, a count can be generated (e.g., by a counting component) for the at least one matching reference segments. At 512, matching reference segments are eliminated (e.g., by a filtering component) as potential matches based on the count.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables hardware to perform specific functions (e.g. generating interest points and/or fingerprints); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 6:
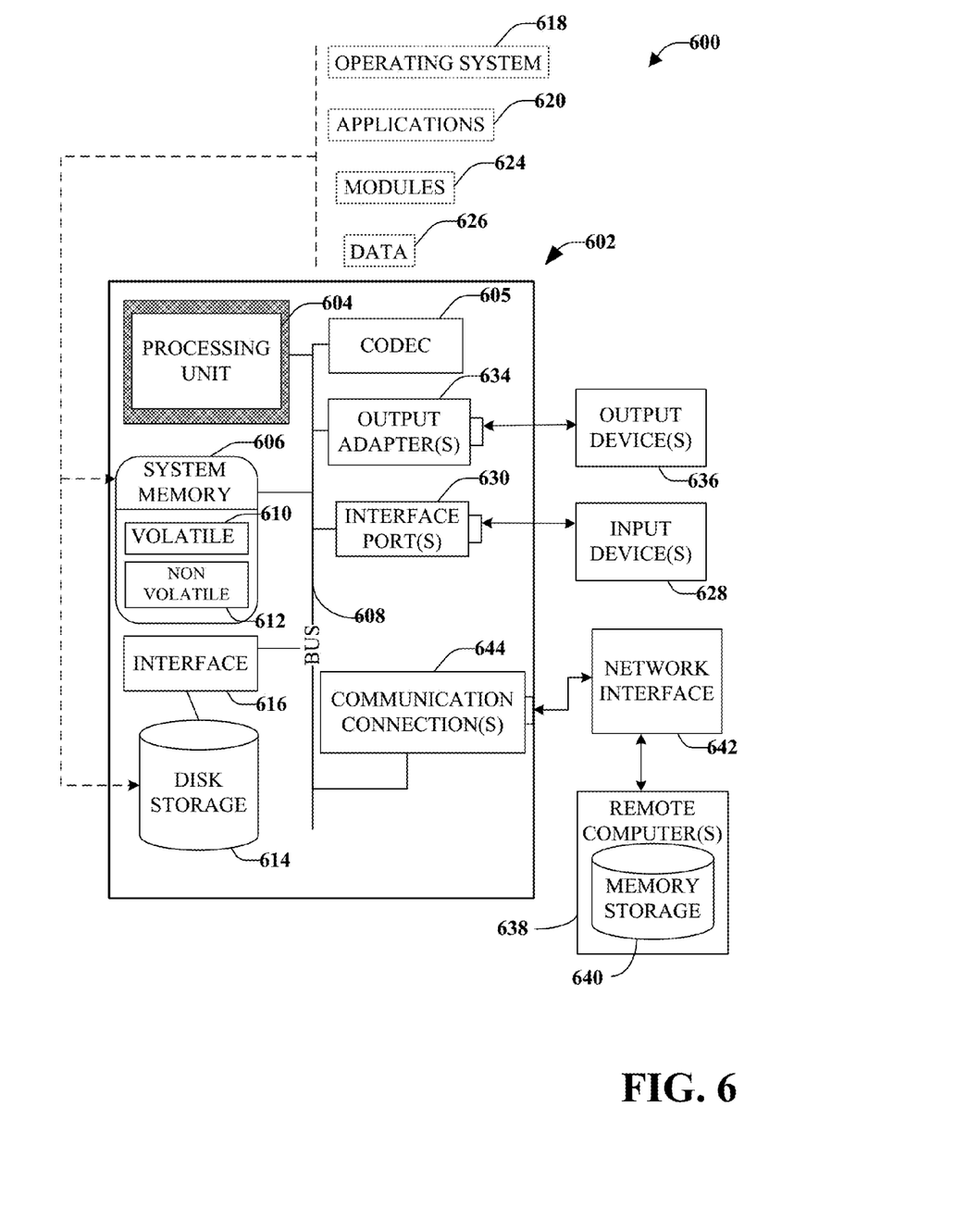
FIG. 6 illustrates an example schematic block diagram for a computing environment in accordance with the subject specification.

With reference to FIG. 6, a suitable environment 600 for implementing various aspects of the claimed subject matter includes a computer 602. The computer 602 includes a processing unit 604, a system memory 606, a codec 605, and a system bus 608. The system bus 608 couples system components including, but not limited to, the system memory 606 to the processing unit 604. The processing unit 604 can be any of various available processors. Dual microprocessors and other multiprocessor architectures also can be employed as the processing unit 604.

The system bus 608 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 606 includes volatile memory 610 and non-volatile memory 612. The basic input/output system (BIOS), containing the basic routines to transfer information between elements within the computer 602, such as during start-up, is stored in non-volatile memory 612. By way of illustration, and not limitation, non-volatile memory 612 can include read only memory (ROM), programmable ROM (PROM), electrically programmable ROM (EPROM), electrically erasable programmable ROM (EEPROM), or flash memory. Volatile memory 610 includes random access memory (RAM), which acts as external cache memory. According to present aspects, the volatile memory may store the write operation retry logic (not shown in FIG. 6) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ES-DRAM).

Computer 602 may also include removable/non-removable, volatile/non-volatile computer storage media. FIG. 6 illustrates, for example, a disk storage 614. Disk storage 614 includes, but is not limited to, devices like a magnetic disk drive, solid state disk (SSD) floppy disk drive, tape drive, Jaz drive, Zip drive, LS-100 drive, flash memory card, or memory stick. In addition, disk storage 614 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 614 to the system bus 608, a removable or non-removable interface is typically used, such as interface 616.

It is to be appreciated that FIG. 6 describes software that acts as an intermediary between users and the basic computer resources described in the suitable operating environment 600. Such software includes an operating system 618. Operating system 618, which can be stored on disk storage 614, acts to control and allocate resources of the computer 602. Applications 620 take advantage of the management of resources by operating system 618 through program modules 624, and program data 626, such as the boot/shutdown transaction table and the like, stored either in system memory 606 or on disk storage 614. It is to be appreciated that the claimed subject matter can be implemented with various operating systems or combinations of operating systems.

A user enters commands or information into the computer 602 through input device(s) 628. Input devices 628 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 604 through the system bus 608 via interface port(s) 630. Interface port(s) 630 include, for example, a serial port, a parallel port, a game port, and a universal serial bus (USB). Output device(s) 636 use some of the same type of ports as input device(s) 628. Thus, for example, a USB port may be used to provide input to computer 602, and to output information from computer 602 to an output device 636. Output adapter 634 is provided to illustrate that there are some output devices 636 like monitors, speakers, and printers, among other output devices 636, which require special adapters. The output adapter 634 includes, by way of illustration and not limitation, video and sound cards that provide a means of connection between the output device 636 and the system bus 608. It should be noted that other devices and/or systems of devices provide both input and output capabilities such as remote computer(s) 638.

Computer 602 can operate in a networked environment using logical connections to one or more remote computers, such as remote computer(s) 638. The remote computer(s) 638 can be a personal computer, a server, a router, a network PC, a workstation, a microprocessor based appliance, a peer device, a smart phone, a tablet, or other network node, and typically includes many of the elements described relative to computer 602. For purposes of brevity, only a memory storage device 640 is illustrated with remote computer(s) 638. Remote computer(s) 638 is logically connected to computer 602 through a network interface 642 and then connected via communication connection(s) 644. Network interface 642 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 644 refers to the hardware/software employed to connect the network interface 642 to the system bus 608. While communication connection 644 is shown for illustrative clarity inside computer 602, it can also be external to computer 602. The hardware/software necessary for connection to the network interface 642 includes, for exemplary purposes only, internal and external technologies such as, modems including regular telephone grade modems, cable modems and DSL modems, ISDN adapters, and wired and wireless Ethernet cards, hubs, and routers.

Figure 7:
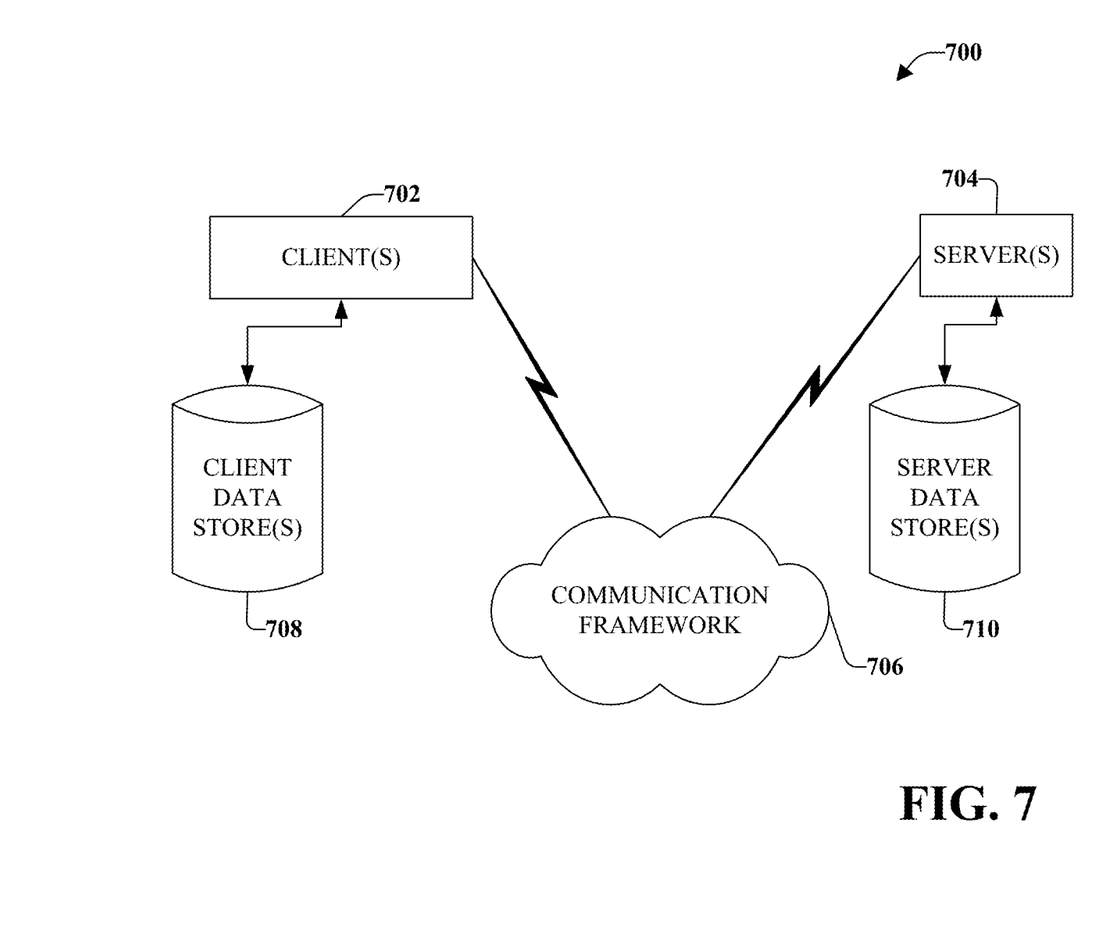
FIG. 7 illustrates an example block diagram of a computer operable to execute the disclosed architecture.

Referring now to FIG. 7, there is illustrated a schematic block diagram of a computing environment 700 in accordance with the subject specification. The system 700 includes one or more client(s) 702, which can include an application or a system that accesses a service on the server 704. The client(s) 702 can be hardware and/or software (e.g., threads, processes, computing devices). The client(s) 702 can house cookie(s), metadata, and/or associated contextual information by employing the specification, for example.

The system 700 also includes one or more server(s) 704. The server(s) 704 can also be hardware or hardware in combination with software (e.g., threads, processes, computing devices). The servers 704 can house threads to perform, for example, reference matching, interest point detection, filtering, counting, time aligning, frequency aligning, or generating frequency ratios in accordance with the subject disclosure. One possible communication between a client 702 and a server 704 can be in the form of a data packet adapted to be transmitted between two or more computer processes where the data packet contains, for example, an audio sample. The data packet can include a cookie and/or associated contextual information, for example. The system 700 includes a communication framework 706 (e.g., a global communication network such as the Internet) that can be employed to facilitate communications between the client(s) 702 and the server(s) 704.

Communications can be facilitated via a wired (including optical fiber) and/or wireless technology. The client(s) 702 are operatively connected to one or more client data store(s) 708 that can be employed to store information local to the client(s) 702 (e.g., cookie(s) and/or associated contextual information). Similarly, the server(s) 704 are operatively connected to one or more server data store(s) 710 that can be employed to store information local to the servers 704.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present invention. It is, of course, not possible to describe every conceivable combination of components or methodologies for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. An audio matching system comprising:
    a memory that stores computer executable components; and
    a processor that executes the computer executable components stored within the memory, the computer executable components comprising:
        a reference matching component that generates matching reference segments based on a probe segment;
        an interest point detection component that generates reference segment interest points for each of the matching reference segments and probe segment interest points for the probe segment, wherein the interest points for each of the matching reference segments and the probe segment represent spectral peaks of a specific audio frequency at a corresponding time reference;
        a time alignment component that time aligns the probe segment and each of the matching reference segments based on a probe segment start time and a respective reference segment start time;
        a frequency alignment component that frequency aligns the probe segment and each of the matching reference segments based on at least one overlapping probe segment interest point and a respective reference segment interest point;

a counting component that generates a count for each of the matching reference segments, the count generated as a percentage of a number of the probe segment interest points that overlap with respective reference segment interest points, wherein the overlap is determined when a distance between the spectral peak and the time reference of the probe segment interest points and the corresponding reference segment interest points are within a predefined tolerance; and a filtering component that eliminates matching reference segments when the generated percentage for the respective matching reference segment is below a threshold value, wherein the threshold value is determined based on a trained classifier inferring whether the generated percentage corresponds to a false positive matching reference segment.

2. The system of claim 1, wherein the time alignment component time aligns the probe segment and each of the matching reference segments further based on a probe segment end time and the respective reference segment end time.

3. The system of claim 1, wherein the time alignment component time aligns for at least one of time stretching, time compression, or time shifting.

4. The system of claim 1, wherein the frequency alignment component frequency aligns for at least one of frequency stretching, frequency compressing, or frequency shifting.

5. The system of claim 1, wherein the frequency alignment component further generates a frequency ratio for each of the reference segment interest points that overlap with the probe segment interest points.

6. The system of claim 5, wherein the frequency alignment component frequency aligns using the frequency ratio.

7. The system of claim 1, wherein the filtering component eliminates the matching reference segments further based on the threshold value according to a user preference.

8. The system of claim 1, wherein the counting component further generates an additional feature function.

9. The system of claim 8, wherein the counting component generates the count based on the additional feature function.

10. An audio matching method, comprising:
    employing a processor to execute computer executable instructions stored in a memory to perform the following acts:
    generating matching reference segments based on a probe segment;
    generating reference segment interest points for each of the matching reference segments;
    generating probe segment interest points for the probe segment, wherein the interest points for each of the matching reference segments and the probe segment represent spectral peaks of a specific audio frequency at a corresponding time reference;
    time aligning the probe segment and each of the matching reference segments based on a probe segment start time and a respective reference segment start time;
    frequency aligning the probe segment and each of the matching reference segments based on at least one overlapping probe segment interest point and a respective reference segment interest point;
    generating a count for each of the matching reference segments, the count generated as a percentage of a number of the probe segment interest points that overlap with respective reference segment interest points, wherein the overlap is determined when a distance between the spectral peak and the time reference of the probe segment interest points and the corresponding reference segment interest points are within a predefined tolerance of the respective set; and
    eliminating the matching reference segments when the generated percentage for the respective matching reference segment is below a threshold value, wherein the threshold value is determined based on a trained classifier inferring whether the generated percentage corresponds to a false positive matching reference segment.

11. The method of claim 10, wherein the time aligning is further based on a probe segment end time and the respective reference segment end time.

12. The method of claim 10, wherein time aligning includes aligning for at least one of time stretching, time compression, or time shifting.

13. The method of claim 10, wherein the frequency aligning includes aligning for at least one of frequency stretching, frequency compressing, or frequency shifting.

14. The method of claim 10, further comprising:
    generating a frequency ratio for each of the reference segment interest points that overlap with the probe segment interest points.

15. The method of claim 14, wherein frequency aligning the probe segment and each of the matching reference segments is further based on the frequency ratio.

16. The method of claim 10, wherein eliminating the matching reference segment is further based on the threshold value according to a user preference.

17. An apparatus comprising a non-transitory computer readable medium encoding instructions thereon that, in response to execution by a computing device, cause the computing device to perform operations comprising:
    generating matching reference segments based on a probe segment;
    generating reference segment interest points for each of the matching reference segments;
    generating probe segment interest points for the probe segment, wherein the interest points for each of the matching reference segments and the probe segment represent spectral peaks of a specific audio frequency at a corresponding time reference;
    time aligning the probe segment and each of the matching reference segments based on a probe segment start time and a respective reference segment start time;
    frequency aligning the probe segment and each of the matching reference segments based on at least one overlapping probe segment interest point and a respective reference segment interest point;
    generating a count for each of the matching reference segments, the count generated as a percentage of a number of the probe segment interest points that overlap with respective reference segment interest points, wherein the overlap is determined when a distance between the spectral peak and the time reference of the probe segment interest points and the corresponding reference segment interest points are within a predefined tolerance; and
    eliminating the matching reference segments when the generated percentage for the respective matching reference segment is below a threshold value, wherein the threshold value is determined based on a trained classifier inferring whether the generated percentage corresponds to a false positive matching reference segment.

\* \* \* \* \*